June 17, 1952     R. V. ALLEN     2,600,826
BAIT CONTAINER

Filed Feb. 10, 1950     2 SHEETS—SHEET 1

Rufus V. Allen
INVENTOR.

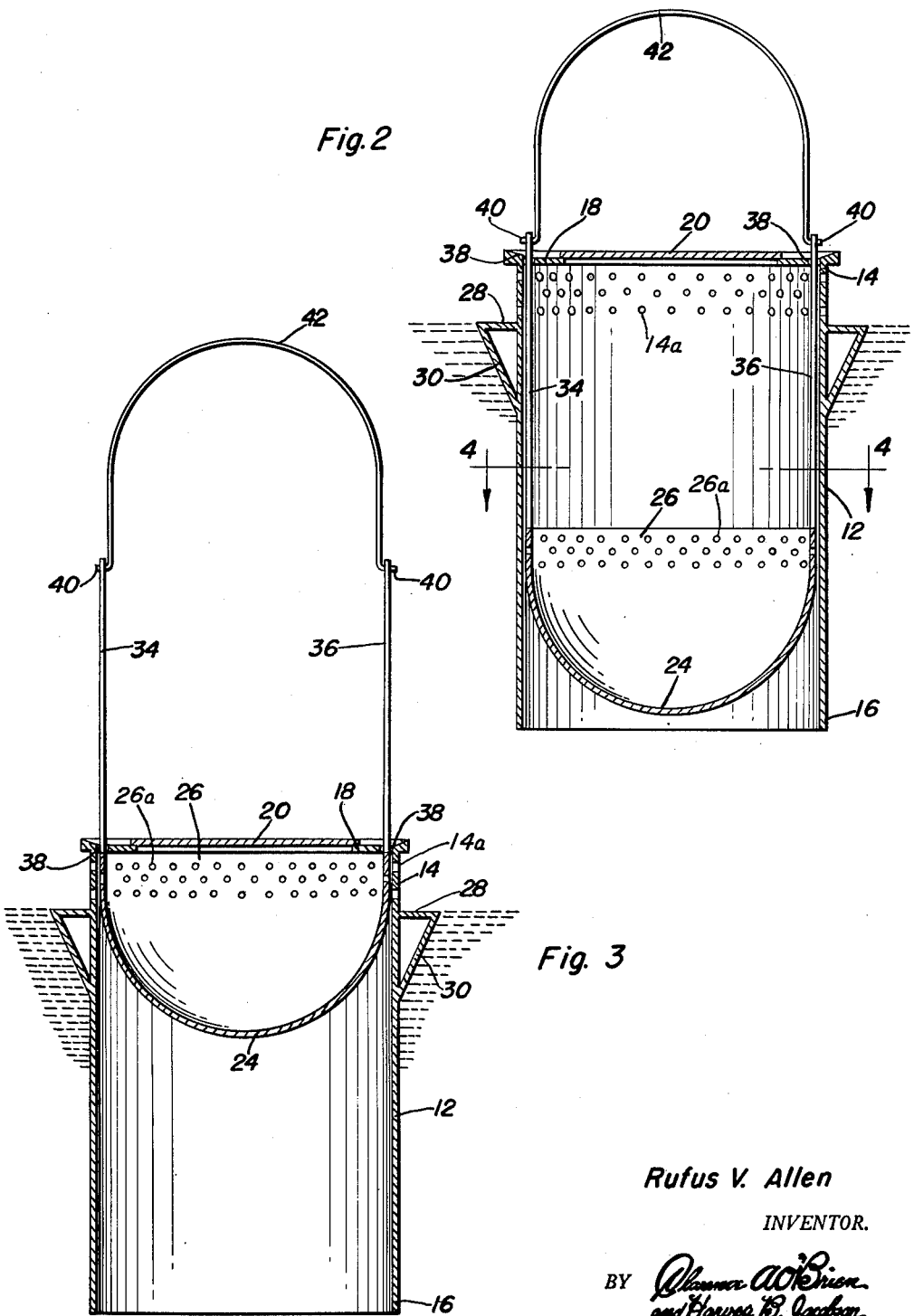

Patented June 17, 1952

2,600,826

UNITED STATES PATENT OFFICE 2,600,826

BAIT CONTAINER

Rufus V. Allen, Chino, Calif.

Application February 10, 1950, Serial No. 143,578

5 Claims. (Cl. 43—56)

This invention relates to new and useful improvements in fishing apparatus and the primary object of the present invention is to provide a bait container so constructed as to permit live bait to be quickly and readily inserted therein or removed therefrom in a convenient manner.

Another very important object of the present invention is to provide a bait container that includes a vertically movable receptacle having an upstanding wall, the upper end of which is perforated so that the receptacle will be lowered below the surface of a body of water before any appreciable amount of water enters therein whereby the water entering the receptacle will be relatively clean as well as cool to retain bait alive and fresh.

Yet another important object of the present invention is to provide a bait container including a vertically movable receptacle having a rounded bottom to facilitate a convenient removal of fish therefrom without injury to the bait.

Another object of the present invention is to provide a live bait container including a movable receptacle received in a shell together with a raising means for the receptacle so located as to permit the receptacle to be raised and the bait removed therefrom without the user having to insert his hands into the water to contaminate fish or live bait.

Another object of the present invention is to provide a bait container including a floatable shell and a receptacle received in the shell at the lower end of the shell to give bait more room to swim and maneuver in the shell, thereby prolonging the life of the bait.

Another object of the present invention is to provide a bait container including a shell having a float means thereon and a slidable receptacle within the shell to permit the shell to remain upright in the water without tilting.

Another object of the present invention is to provide a bait container composed of a receptacle having a rounded bottom that will hold sufficient water to allow transportation of bait from one fishing point to another without harm to the bait therein.

A further object of the present invention is to provide a bait container including a shell having a perforated upper end and a float means about the container adjacent the upper end of the container to allow constant entrance of air to top of the shell where bait can receive the air without striking a closure for the upper end of the shell.

A still further aim of the present invention is to provide a bait container that is simple and practical in construction, strong and reliable in use, relatively inexpensive to manufacture, and otherwise well adapted for the purposes for which the same is intended.

Other objects and advantages reside in the details of construction and operation as more fully hereinafter described and claimed, reference being had to the accompanying drawings forming a part hereof, wherein like numerals refer to like parts throughout, and in which:

Figure 2 is a longitudinal vertical sectional view of the present invention in use as taken substantially on the plane of section line 2—2 of Figure 1;

Figure 3 is a view similar to Figure 2, but showing the receptacle raised; and

Figure 1:
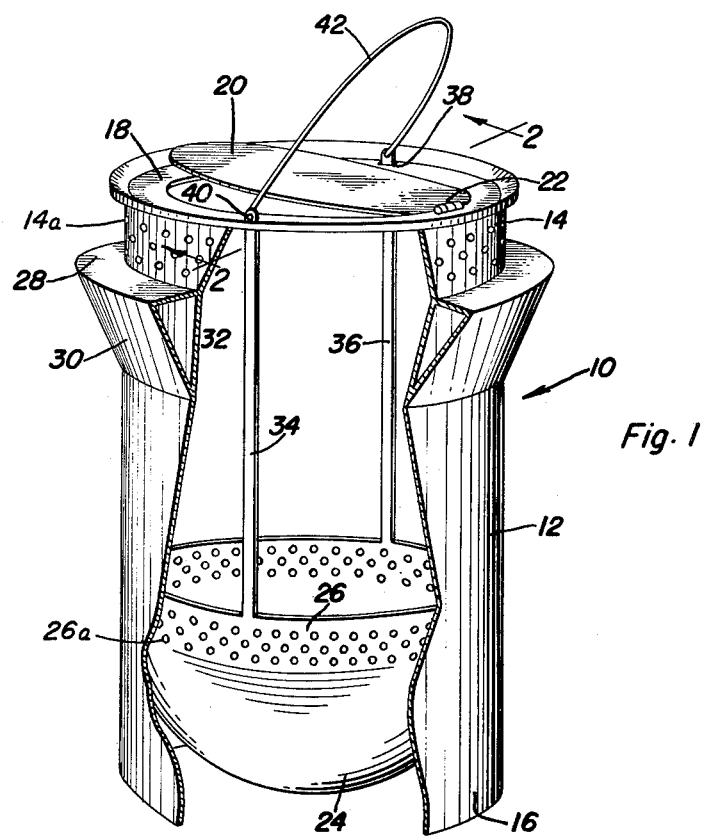
Figure 1 is a perspective view of the present invention and with parts broken away and shown in section.
Figure 4:
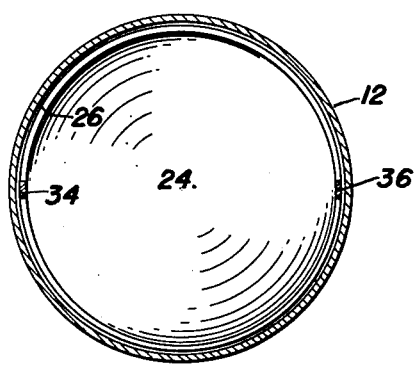
Figure 4 is a transverse horizontal sectional view taken substantially on the plane of section line 4—4 of Figure 2.

Referring now to the drawings in detail, wherein for the purpose of illustration, there is disclosed a preferred embodiment of the present invention, the numeral 10 represents the container generally, including an elongated cylindrical shell 12 having an upper perforated end portion 14 and a lower open end portion 16.

Means is provided for closing the upper open end of the shell 12, and this means consists of a closure including a rim or ring 18 that is suitably secured or removably attached to the upper end of the shell. A door or closure member 20, of a diameter greater than the inner circumference of the ring 18, is hinged, as at 22, to the ring and normally overlies the ring and closes the opening in the ring.

A rounded bottom receptacle 24 is slidably received in the shell 12 and includes an upstanding perforated wall 26 provided with perforations 26a so that when the receptacle is raised a certain amount of water therein will exit through the perforated wall 26 and the upper perforated end 14 of the shell 12 which is provided with perforations 14a.

Float means is associated with the shell 12 in the form of a continuous angle member that embraces the shell adjacent the upper perforated end thereof. This angle member is composed of an upper horizontal flanged portion 28 and a downwardly and inwardly inclined flanged portion 30. The flanged portions 28 and 30 are suitably secured to or form an integral part of the shell and form a closed float chamber 32 that will retain the upper end of the shell exposed from the water.

A pair of spaced parallel arms 34 and 36 rise from diametrically opposite sides of the wall 26 and are slidably received in openings 38 in the rim 18. The upper ends of the arms 34 and 36 are apertured to receive the out-turned end portions 40 of a carrying bail 42. The ends 40 engage the rim 18 to limit downward sliding movement of the receptacle 24 within the shell 12.

In practical use of the present invention, the container 10 is placed in a fluid medium, such as water, and the upper end 14 of the shell 12 is retained above the surface of the water as shown in Figure 2, due to the function and placement of the float means 28, 30.

When bait is to be applied to or removed from the receptacle 24, the bail 42 is raised and the receptacle 24 is pulled upwardly. As the upper wall 26 of the receptacle 24 approaches the upper perforated end 14 of the shell 12, water within the receptacle, above the perforations in wall 26, exits therefrom through the perforations in the end 14. There remains but a small amount of water in the receptacle so that any bait therein can be easily viewed and removed.

As the receptacle 24 is lowered, water to any appreciable extent, does not enter the receptacle until it has been lowered approximately ten inches thereby preventing warm water or scum on the surface of the water from entering the receptacle.

The receptacle 24 is disposed relatively close to the inner periphery of the shell to prevent the escape of bait and the weight of the water in the receptacle 24 tends to overcome any buoyant effect thereof so that bait in the receptacle will be retained in relatively cool water.

The receptacle 24 is sufficiently large to accommodate enough water to permit the entire structure to be transported with live bait in the receptacle 24. However, considerable space is present in the shell for bait to swim and move to the air at the top of the shell without the bait contacting the closure 20.

Any suitable means may be employed for retaining the closure 20 in its closed position. Furthermore, other float means may be used other than the specific type shown as long as the float means functions as disclosed.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A bait container comprising a cylindrical shell having perforations adjacent its upper end, a continuous angle member surrounding said shell and having first and second flanges attached to said shell to form an air chamber, a closure for the upper end of said shell, a receptacle slidably received in said shell, a pair of arms rising from said receptacle, said closure having a pair of openings slidably receiving said arms, and a carrying bail attached to said arms and overlying said closure, said shell being imperforate below said angle member.

2. A bait container comprising a cylindrical shell having upper and lower ends, the upper end of said shell having perforations therein, means carried by said shell adjacent the upper end of said shell for retaining the upper end of said shell above a liquid level, a receptacle slidably received in said shell and including an upper perforated portion and a lower imperforate portion, arms rising from said receptacle, and a closure for the upper end of said shell having openings therein slidably receiving said arms, the portion of said shell below said means being imperforate.

3. The combination of claim 2, wherein said means includes a continuous angle member embracing said shell and including an upper horizontal flanged portion secured directly to the outer periphery of the shell and an inclined flanged portion also secured to the outer periphery of said shell to define an air pocket.

4. The combination of claim 2, wherein said receptacle includes a rounded bottom.

5. A bait container comprising a cylindrical shell, means secured to the outer periphery of the shell adjacent the upper end of the shell for retaining the upper end of the shell above a liquid level, the upper end of said shell being perforated and the portion of said shell below said means being imperforate, a rim secured to the upper end of said shell and extending radially inwardly from the upper end of the shell, a closure plate hinged to said rim and overlying the rim to close the opening in the rim, a receptacle slidably received in the shell and including an upper perforated portion and a lower imperforate portion, a pair of spaced parallel arms rising from the receptacle, said rim having a pair of slots therein slidably receiving said arms and a substantially U-shaped bail having outwardly turned end portions extending through the upper ends of said arms and engaging the rim during lowering of the receptacle to limit downward sliding movement of the receptacle in the shell, said bail being manually swung against the rim to permit opening of the closure plate when the receptacle is lowered within the shell.

RUFUS V. ALLEN.

REFERENCES CITED

The following references are of record in the file of this patent:

UNITED STATES PATENTS

| Number | Name | Date |
|---|---|---|
| 713,890 | Koch | Nov. 18, 1902 |
| 769,874 | Paar | Sept. 13, 1904 |
| 1,021,150 | Horner | Mar. 26, 1912 |
| 1,745,012 | Gilmore | Jan. 28, 1930 |
| 1,773,804 | Bergen | Aug. 26, 1930 |